United States Patent
Lodeweyckx

(10) Patent No.: US 9,185,551 B2
(45) Date of Patent: Nov. 10, 2015

(54) MOBILE COMMUNICATIONS

(75) Inventor: Stefan Lodeweyckx, Weybridge (GB)

(73) Assignees: SONY CORPORATION, Tokyo (JP); SONY EUROPE LIMITED, Weybridge (GB)

( * ) Notice: Subject to any disclaimer, the term of this patent is extended or adjusted under 35 U.S.C. 154(b) by 140 days.

(21) Appl. No.: 13/524,596

(22) Filed: Jun. 15, 2012

(65) Prior Publication Data

US 2012/0322410 A1   Dec. 20, 2012

(30) Foreign Application Priority Data

Jun. 17, 2011   (GB) .................................. 1110236.5

(51) Int. Cl.
*H04W 12/06*   (2009.01)
*H04W 88/02*   (2009.01)
(Continued)

(52) U.S. Cl.
CPC .............. *H04W 8/265* (2013.01); *H04W 12/06* (2013.01); *H04W 8/183* (2013.01); *H04W 48/18* (2013.01)

(58) Field of Classification Search
CPC ... H04W 76/021; H04W 8/02; H04W 84/045; H04W 8/26; H04W 92/02; H04W 12/04; H04W 12/06; H04W 24/02; H04W 68/025; H04W 88/12; H04W 92/04; H04W 16/32; H04W 60/00; H04W 92/14; H04W 92/20
USPC .................................. 455/558, 441, 35.1, 435
See application file for complete search history.

(56) References Cited

U.S. PATENT DOCUMENTS 5,765,105 A   6/1998 Kuriki
5,933,785 A * 8/1999 Tayloe ........................... 455/558

(Continued)

FOREIGN PATENT DOCUMENTS

EP    0378775       * 11/1989
EP    1 239 687 A1   9/2002
(Continued)

OTHER PUBLICATIONS

Extended European Search Report issued Oct. 18, 2012 in Patent Application No. 12172074.2.
(Continued)

*Primary Examiner* — Lester Kincaid
*Assistant Examiner* — Gary Lafontant
(74) *Attorney, Agent, or Firm* — Oblon, McClelland, Maier & Neustadt, L.L.P.

(57) ABSTRACT

An identification module (such as a SIM card) for securely providing a mobile identity to a mobile data network for use in identifying mobile equipment in which that identification module is installed comprises a mobile identity memory which securely stores data defining two or more different mobile identities; a selector for selecting a mobile identity from the two or more mobile identities; a network interface for generating data derived from the selected mobile identity for transmission to a mobile network during a network authorization procedure, and for receiving acknowledgement data back from the mobile network indicating whether authorization was successful based on that selected mobile identity; and a detector for detecting whether the acknowledgement data indicates an unsuccessful authorization with the mobile network and, if so, for initiating a further network authorization procedure in which the selector selects a different one of the two or more mobile identities.

14 Claims, 14 Drawing Sheets

| 561 | IMSI | $K_i$ |
|---|---|---|
| 562 | IMSI | $K_i$ |
| ⋮ | ⋮ | ⋮ |
| 569 | IMSI | $K_i$ |
| 570 | Final IMSI | $K_i$ |
| 571 | Reverse IMSI | $K_i$ |

(51) Int. Cl.
*H04W 8/26* (2009.01)
*H04W 8/18* (2009.01)
*H04W 48/18* (2009.01)

(56) References Cited

U.S. PATENT DOCUMENTS

| | | | |
|---|---|---|---|
| 6,738,622 B1 * | 5/2004 | Stadelmann et al. | 455/435.1 |
| 7,460,854 B2 * | 12/2008 | Griffith et al. | 455/410 |
| 8,583,081 B2 * | 11/2013 | Ait Aissa et al. | 455/435.1 |
| 2006/0205434 A1 * | 9/2006 | Tom et al. | 455/558 |
| 2006/0234693 A1 | 10/2006 | Isidore et al. | |
| 2008/0096555 A1 | 4/2008 | Herrmann | |
| 2008/0146222 A1 * | 6/2008 | Vikberg et al. | 455/433 |
| 2010/0009659 A1 | 1/2010 | Netanel et al. | |
| 2010/0197350 A1 | 8/2010 | Jeung | |
| 2010/0273462 A1 | 10/2010 | Thorn et al. | |
| 2010/0279698 A1 | 11/2010 | Wong | |
| 2011/0193718 A1 | 8/2011 | Chevrette et al. | |
| 2011/0256906 A1 | 10/2011 | Kumar | |

FOREIGN PATENT DOCUMENTS

| | | | |
|---|---|---|---|
| GB | 2 336 507 | | 10/1999 |
| JP | 2007-235492 | | 9/2007 |
| WO | WO 9955107 A1 * | | 10/1999 |
| WO | WO 0211357 | * | 2/2002 |
| WO | WO 2004/091165 A1 | | 10/2004 |
| WO | WO 2006031898 A2 * | | 3/2006 |
| WO | WO 2006031898 A2 * | | 11/2006 |
| WO | WO 2010/073265 A2 | | 7/2010 |
| WO | WO 2010/073265 A3 | | 7/2010 |
| WO | WO 2010073265 A2 * | | 7/2010 |
| WO | WO 2011/041913 A1 | | 4/2011 |
| WO | WO 2011041913 A1 * | | 4/2011 |
| WO | WO 2011041913 A1 * | | 8/2011 |

OTHER PUBLICATIONS

U.S. Appl. No. 13/540,043, filed Jul. 2, 2012, Lodeweyckx.
"3rd Generation Partnership Project; Technical Specification Group Services and System Aspects; 3G Security; Security Principles and Objectives", 3G TS 33.120 version 3.0.0, 3GPP, May 1999, 10 pages.
"Smart Cards; Secured packet structure for UICC based applications", Release 9, ETSI TS 102 225 v9.0.0, ETSI, Apr. 2010, 22 pages.
United Kingdom Search Report Dated Feb. 20, 2012, Issued Feb. 21, 2012, in Great Britain Patent Application No. 1110236.5, filed Jun. 17, 2011.
United Kingdom Search Report Dated Oct. 13, 2011, Issued Feb. 21, 2012, in Great Britain Patent Application No. 1110236.5, filed Jun. 17, 2011.
United Kingdom Search Report Dated Feb. 16, 2012, Issued Feb. 21, 2012, in Great Britain Patent Application No. 1110236.5, filed Jun. 17, 2011.

* cited by examiner

Example: 206 01 1234567890

MOBILE COMMUNICATIONS

CROSS REFERENCE TO RELATED APPLICATION

The present application claims the benefit of the earlier filing date of UK patent application number 1110236.5 filed in the United Kingdom Intellectual Property Office on 17 Jun. 2011, the entire content of which application is incorporated herein by reference.

BACKGROUND

1. Field of the Disclosure

This invention relates to mobile communications.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor implicitly admitted as prior art against the present invention.

Some items of user equipment (UE) can make use of a mobile Internet (data) connection but do not necessarily require such an Internet connection for normal operation. An example of such equipment might be a portable gaming device or an electronic book (e-book) reader device. Here, the device may have sufficient stand-alone functionality that a user can enjoy owning and operating the device in the long term without needing to set up a mobile data service with associated ongoing costs.

However, the device manufacturer or retailer may realise that the functionality of the device, and hence the user's enjoyment of the device after purchase, can be enhanced by connecting the device to a mobile data network. For example, in the case of a portable gaming device, this could allow interactive games to be played away from the home, or high scores and other game data to be uploaded or downloaded to a game server. In the case of an e-book reader device, a mobile data network connection could allow e-books to be purchased or otherwise downloaded away from the home, or could allow a subscription to a daily newspaper or other real-time publishing arrangement to be fulfilled.

So, the use of the mobile data network can make the user's experience of the purchased device more attractive. It is therefore in the interests of the manufacturer of the device to encourage the user to enable a mobile data network service.

Another incentive for encouraging the user to enable a mobile data network service is that a commission may be payable to the manufacturer and/or to the retailer when the user establishes a chargeable mobile data network account.

One way to encourage a user to establish a chargeable mobile data network account, and also to demonstrate the added enjoyment that such a mobile data connection could bring to the user's experience of the device, is to provide a trial period of perhaps two to four weeks, during which period the user may make use of a mobile data network connection freely, without having to establish a long-term or otherwise chargeable contract with the mobile data network provider. At the end of the trial period, the user has to make a choice as to whether to continue using mobile data network access, in which case the user must start to pay for it, or to cease using mobile data network access.

A technologically straightforward way of allowing such a trial period would be to equip each UE device, as sold, with a conventional mobile SIM (subscriber identification module) card which is activated to a mobile data network. The manufacturer enters into an agreement with the mobile data network provider so that the manufacturer pays for any mobile data access made during the first two to four weeks of use of any of the individual SIM cards. At the end of the trial period of use, the user's free access (that is to say, the access paid for by the manufacturer) is terminated so that the user is forced to choose whether to establish a chargeable account or to cease using mobile data with the device.

However, a disadvantage of this technique is as follows. Whenever a SIM card is initially activated with a mobile network, the entity carrying out the activation has to pay a fee to the mobile data network. At the time of filing the present application, such a fee is typically between € 1 and € 10 for each SIM card.

This fee is perhaps acceptable for a manufacturer when the manufacturer is reasonably certain that the purchaser will go on to establish a chargeable contract using that SIM card. So, in the case of the purchase of a mobile telephone, the activation fee can be absorbed by the manufacturer or retailer because commission will be payable when the user starts to make chargeable calls. However, with a data-only device of the type described above (that is to say, a device which already has adequate functionality without necessarily needing a mobile data network connection), there may be some unwillingness by the user to bother with a chargeable mobile data network connection. This could mean that the manufacturer has to pay a fee for each SIM card in each device is sold, but only a relatively small proportion of the SIM cards are eventually linked with a chargeable mobile data account.

SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

This invention provides a method of operation of a mobile data network having multiple mobile terminals, the method comprising distributing a set of mobile identities amongst the mobile terminals such that:

each mobile terminal holds a respective subset comprising two or more of the set of mobile identities;

at least some of the mobile identities are held by more than one mobile terminal;

a mobile terminal can connect to the mobile data network using any one of that mobile terminal's subset of mobile identities, subject to that mobile identity not already being in use in respect of a current connection by another mobile terminal.

Embodiments of the invention have an aim to allow a potential reduction of the initial activation cost for the manufacturer while still providing the user with a trial period to assess whether they wish to establish a mobile data network account.

A solution provided by at least embodiments of the invention is that the manufacturer establishes a pool of temporary-use mobile network identities. The manufacturer pays an activation fee in respect of each of the temporary-use mobile identities. However, the number of temporary-use mobile identities can be less than the number of SIMs or devices as sold (or as predicted to be sold, based on a future sales forecast) so that at least one of the mobile identities stored by one of the set of SIMs is identical to a mobile identity stored by another of the set.

Purely as an example, the number of temporary mobile identities could be established as (say) 20% of the expected sales volume of the devices. This means that the initial activation fees payable by the manufacturer are reduced by 80% relative to the situation described above whereby the manufacturer activates a mobile identity for each device as sold.

The technique then allows for (a) an individual one of the temporary-use mobile identities to be allocated to multiple UEs, and (b) each UE to have several temporary-use mobile identities available to it.

The temporary-use mobile identities may then be used by the UE during the trial period. After the trial period is over, if the user wishes to continue with mobile data access, the user must establish a payment arrangement with the mobile network provider based on a fixed and individual mobile identity.

Accordingly, embodiments of the invention can allow a manufacturer to make available a trial period of mobile data access without necessarily having to pay for the initial activation of one mobile identity for each UE sold.

This invention also provides an identification module for securely providing a mobile identity to a mobile data network for use in identifying mobile equipment in which that identification module is installed, the identification module comprising:

a mobile identity memory which securely stores data defining two or more different mobile identities;

a selector for selecting a mobile identity from the two or more mobile identities;

a network interface for generating data derived from the selected mobile identity for transmission to a mobile network during a network authorization procedure, and for receiving acknowledgement data back from the mobile network indicating whether authorization was successful based on that selected mobile identity; and a detector for detecting whether the acknowledgement data indicates an unsuccessful authorization with the mobile network and, if so, for initiating a further network authorization procedure in which the selector selects a different one of the two or more mobile identities.

This invention also provides mobile data processing apparatus comprising:

a wireless interface arranged to communicate with a mobile data network;

a removable identification module providing data to the wireless interface so as to identify the mobile data processing apparatus to the mobile data network according to a mobile identity stored by that identification module; and a further non-removable identification module storing a separate mobile identity;

in which the apparatus is configured to attempt authorization with a mobile network using the separate mobile identity stored on the further identification module in response to one of a predetermined list of data processing events comprising one or more events selected from: a detection by the apparatus of a data processing failure by the apparatus; and a scheduled request by the apparatus for a data and/or software update from an update server.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
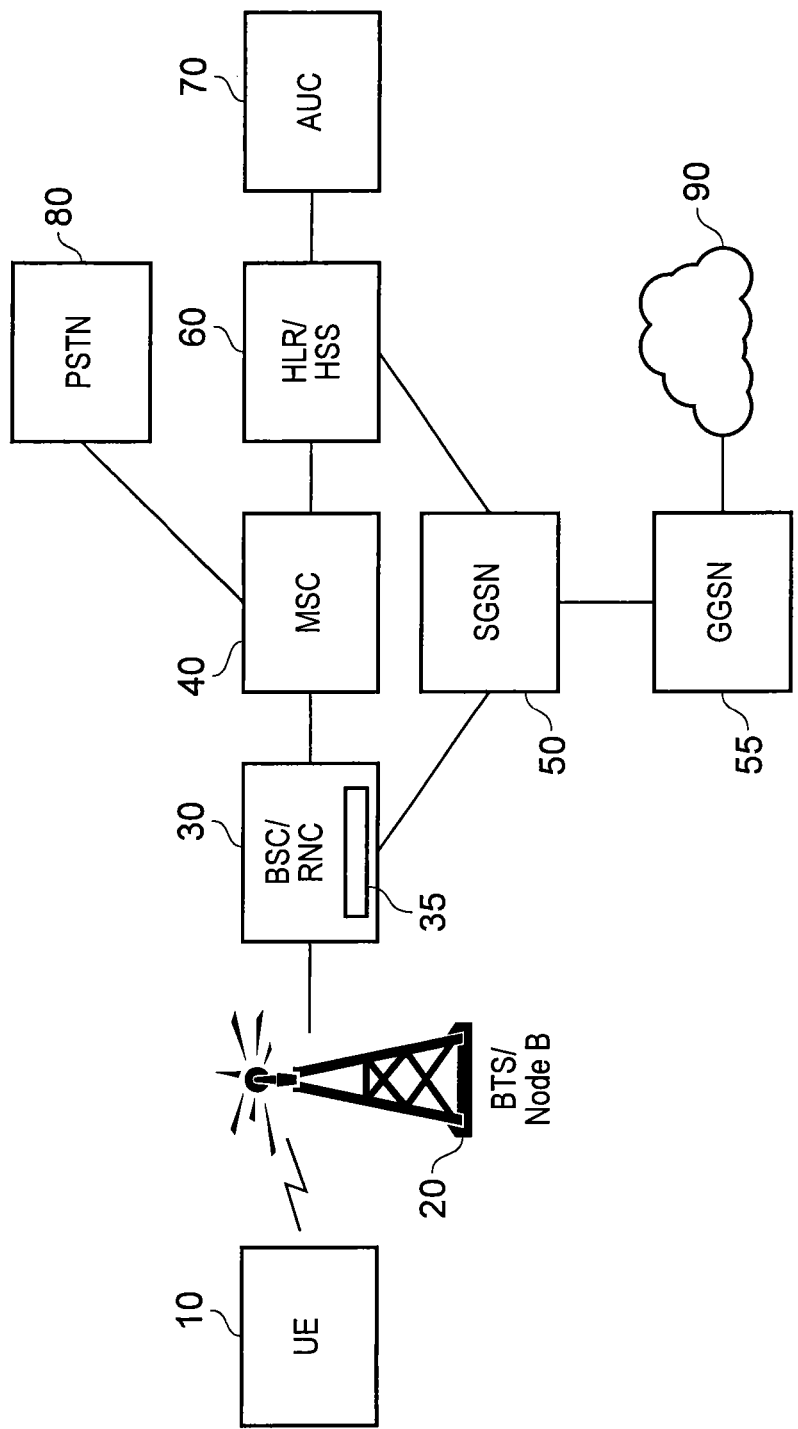
FIG. 1 is a schematic diagram of a mobile communications network.

Reference is now made to the drawings, wherein like reference numerals designate identical or corresponding parts throughout the several views.

Referring now to FIG. 1, a mobile communications network comprises a user equipment (UE) 10, a base transceiver station (BTS) 20 (the equivalent function being referred to as "NodeB" in the context of a UMTS (Universal Mobile Telecommunications System) 3G (third generation) network, but only the acronym BTS will be used in this description), a base station controller/radio network controller (BSC/RNC) 30, a mobile switching centre (MSC) 40, a serving GPRS (general packet radio service) support node (SGSN) 50, a Gateway GPRS Support Node (GGSN) 55, a home location register (HLR) 60 and an authentication centre (AUC) 70. The MSC 40 connects to a public switched telephone network (PSTN) 80. The SGSN 50 connects to the Internet 90 via the GGSN 55.

In operation, the UE 10 connects via a wireless link to the BTS 20 which in turn is connected (usually by a wired link) to the BSC/RNC 30. The BTS contains equipment for transmitting and receiving radio signals, antennas, and equipment for encrypting and decrypting communications with the BSC/RNC 30.

The BSC/RNC 30 controls the operation of the BTSs 20. Typically a BSC/RNC has many BTSs under its control. The BSC/RNC allocates radio channels and controls the handover of communication with a particular UE between different BTSs. The BSC/RNC 30 also multiplexes the many different low data rate communications with individual UEs into a higher data rate connection with the MSC 40.

The BSC/RNC 30 may have an associated packet control unit (PCU) 35 which carries out some of the functions of the BSC/RNC 30, but for packet data. The BSC/RNC, BTSs and PCU are sometimes collectively referred to as the BSS (base station subsystem) or, in 3G networks, the RAN (radio access network).

The MSC 40 is primarily responsible for routing voice calls, SMS (short messaging service, otherwise known as "text") messages and circuit switched data. In respect of voice calls, the MSC 40 is able to route a call from a mobile UE to a fixed (landline) telephone using the PSTN 80. In general terms, the MSC is responsible for setting up and releasing the end-to-end connection, supervising hand-over between BSC/RNCs during a call and coordinating charging and account monitoring.

The HLR 60 (the generally equivalent function within 3G networks being known as the Home Subscriber Server or HSS) is a central database that contains details of each mobile phone subscriber that is authorised to use the core network. There can be several HLRs in existence, though each individual mobile subscriber identity can be associated only with one logical HLR (although this can span several physical nodes) at a time.

The HLRs store details of every SIM card issued by a mobile phone operator. Each SIM card has a unique identifier called an IMSI which is the primary key to each HLR record. The HLR also stores MSISDNs (Mobile Subscriber Integrated Services Digital Network Numbers) which represent the telephone numbers associated with the SIM cards. A SIM card has a primary MSISDN which is the number used for making and receiving voice calls and SMS messages, but it is possible for a SIM to have other secondary MSISDNs, for example being associated with fax or circuit switched data calls. An IMSI is also associated with details of services applicable to that user and call divert settings associated with an MSISDN.

The HLR 60 also connects to the AUC 70 whose function is to authenticate each SIM card that attempts to connect to the network. This authentication process will be described in detail below. In brief, however, when the authentication process takes place (typically when a UE is first switched on), the UE sends its IMSI to the AUC via the HLR. The AUC replies with a so-called triplet of authentication data derived using a secure key known only to the AUC and to the SIM. This secure key is referred to as Ki. The SIM then sends a further reply to the AUC based on data from the triplet and, assuming the reply is in the correct form, the SIM (that is to say, that IMSI) is authorised for interaction with the network. The secure key Ki is securely stored on the SIM (which in the case of current SIMs takes place during manufacture), and is also securely replicated onto the AUC. These are the only copies of the secure key Ki. Ki is never transmitted between the AUC and the SIM, but instead is combined with the IMSI to produce a challenge and response for identification purposes and an encryption key called Kc for use in over-the-air communications.

The IMSI-Ki pair represents data defining a mobile identity, comprising an identification value (IMSI) which is transmitted to the mobile network as part of the network authorization procedure, and a secure key (Ki) which is not transmitted to the mobile network as part of the network authorization procedure, but from which the same card's network interface derives identification data and encryption/decryption key data for use in encryption and decryption of data communication over the mobile network.

Once authentication has taken place, the authorization triplet data is buffered at the SGSN 50. As mentioned, the triplet includes the encryption key Kc for use in encrypting data transfers between the UE and the network. The encryption/decryption process using Kc takes place at the currently active BSS/RAN applicable to that UE.

The Gateway GPRS Support Node (GGSN) is a main component of the GPRS network and handles matters such as IP (internet Protocol) address assignment and the like. The GGSN controls interaction between the GPRS network and external packetised networks such as the Internet 90. The GGSN checks if a user (being a recipient of a data transfer) is active, and if so, forwards the data to the respective SGSN serving that user. If the mobile user is inactive, the data is discarded. When a user initiates a data transfer, the packetised data is routed to the correct external network by the GGSN.

Figure 2:
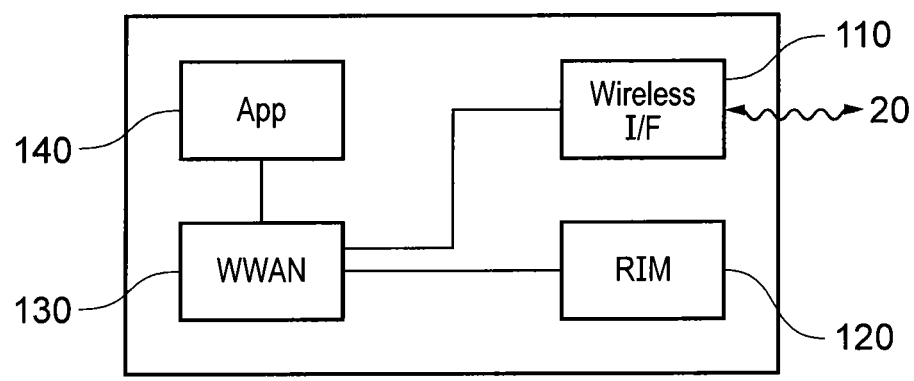
FIG. 2 is a schematic diagram of a user equipment (UE)

FIG. 2 is a schematic diagram of an example UE making use of data communications via the mobile network. The UE comprises a wireless interface 110 which provides the wireless communication with the BTS 20, a SIM card 120, a wireless wide area network (WWAN) processor 130 and application software 140. It will be understood that the application software 140 communicates with a user interface such as a keyboard, a display, a touch screen and the like. For clarity, these items are not shown in FIG. 2.

The SIM card acts as an identification module for securely providing a mobile identity to a mobile data network for use in identifying mobile equipment in which that identification module is installed.

Once the SIM card of the UE 10 has been authorised, the operation involves the application software 140 initiating a message to be sent via the mobile network and passing that message to the WWAN processor 130 which formats it into a suitable form for transmission (for example as so-called IP data packets). Using a key Kc supplied by the SIM card and an "A5" encryption algorithm, the WWAN processor 130 encrypts the data packets. The encryption key Kc used for encryption is the one that was established during the authorization process. The encrypted data is then passed from the WWAN processor 130 to the wireless interface 110 for transmission to the BTS 20. With regard to messages received from the network, data is transmitted from the BTS 20 to the UE and is received by the wireless interface 110. The data is decrypted by the WWAN processor using a key Kc supplied by the SIM card 120, and is formatted (for example, depacketised) to be passed to the application software 140.

Figure 3:
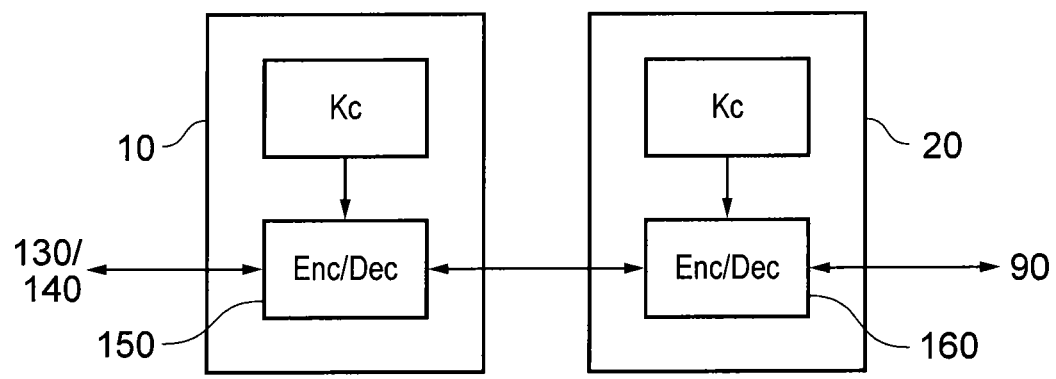
FIG. 3 is a schematic diagram of a data communication process via the network of FIG. 1.

FIG. 3 is a schematic diagram of a data communication process via the network of FIG. 1. Here, the encryption and decryption processes are illustrated in a schematic form. At the UE 10, data passing to and from the application software 140 (via the WWAN processor 130) is subject to an encryption/decryption process 150 under the control of the key Kc. The encrypted data is passed via the mobile network to the BTS 20 where it is decrypted using an encryption/decryption process 160, again with reference to the key Kc. The clear (no longer encrypted) data is then transferred to and from the Internet 90. Accordingly, the data path between the SIM card 120 and the BTS 20 carries data which is encrypted using the key Kc, whether that data is being transmitted to the UE or from the UE. Data outside of that encrypted path is clear data.

Figure 4:
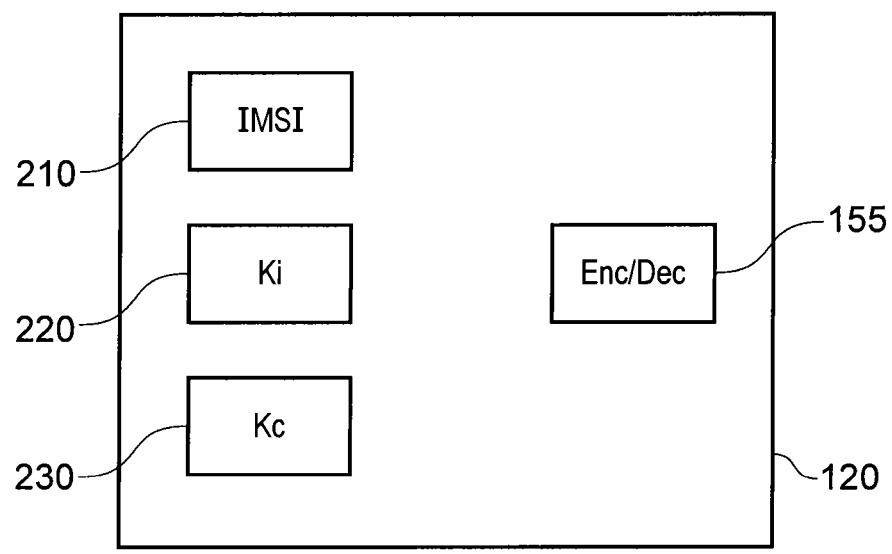
FIG. 4 schematically illustrates a SIM card.

FIG. 4 schematically illustrates a SIM card. The term "SIM" stands for "subscriber identification module", and this identification function is carried out by virtue of the SIM card carrying a unique IMSI and associated respective unique secure key Ki associated with a subscriber. The significant features of the SIM card shown in FIG. 4 are as follows: secure storage (or at least a mobile identity storage controller for accessing memory, which would normally be on the SIM card, which securely stores data defining the IMSI) for the IMSI 210, secure storage 220 (or at least a storage controller as above) holding the secure key Ki, memory storage 230 which holds the encryption key Kc and other temporary data and an encryption/decryption function 155 which also acts as a network interface for generating data derived from a mobile identity for transmission to a mobile network during a network authorization procedure, and for handling acknowledgement data received back from the mobile network indicating whether authorization was successful based on that mobile identity. The encryption/decryption function 155 carries out various different functions at different stages in operation. At least three encryption algorithms are provided. In brief, these are referred to as the A3 algorithm and the A8 algorithm. The A5 algorithm is used by the WWAN processor 130 and will be described for comparison.

The A3 algorithm is a one-way function used to compute a signed response (SRES) during the authentication process. The generation and use of the SRES will be described further below. The A3 algorithm resides on the SIM card and at the AUC.

The A5 algorithm is a two-way function used by the WWAN processor 130 to encrypt and decrypt data that is being transmitted over the wireless interface, that is to say, it is the function which encrypts and decrypts data using the encryption/decryption key Kc described with reference to FIG. 3.

The A8 algorithm is a one way function used to generate the 64-bit key Kc. The generation of the key Kc will be described further below. The A8 algorithm also resides on the SIM card and at the AUC.

Figure 5:
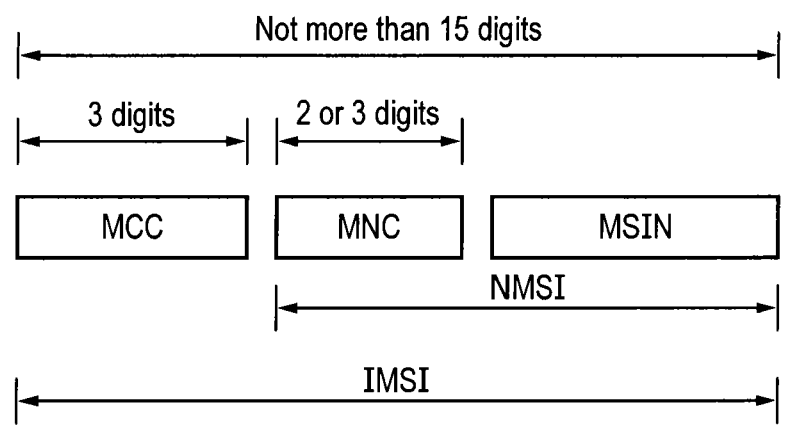
FIG. 5 schematically illustrates the structure of an IMSI (International Mobile Subscriber Identifier)

Note that in 3G networks, an enhanced authentication algorithm (AKA—Authentication and Key Agreement) is used, and other algorithms than the A5 algorithm may be used. Other techniques, such as using a 128 bit CK (Ciphering Key) rather than the 64 bit Kc, may apply. Differences between 3G and 2G (second generation) networks are widely published, for example in http://www.3gpp.org/ftp/tsg_sa/wg3_security/_specs/33120-300.pdf FIG. 5 schematically illustrates the format of an IMSI. The term "IMSI" stands for "international mobile subscriber identifier" and represents a unique identification associated with all users of the network. It is stored as a 64-bit field in secure storage 210 within the SIM card and, when required, is sent by the UE to the network.

The maximum length of an IMSI is 15 decimal digits. The first three digits represent a mobile country code or MCC which identifies the country of origin of the subscriber's SIM card. The next two or three digits represent a mobile network code or MNC which identifies a network company which provided (or possibly, which owns) the SIM card. The final digits provide a mobile subscriber identification number or MSIN which is unique to a particular SIM card within that network and that country defined by the MNC and MCC. The MNC and MSIN together provide a national mobile subscriber identification or NMSI.

Figure 6:
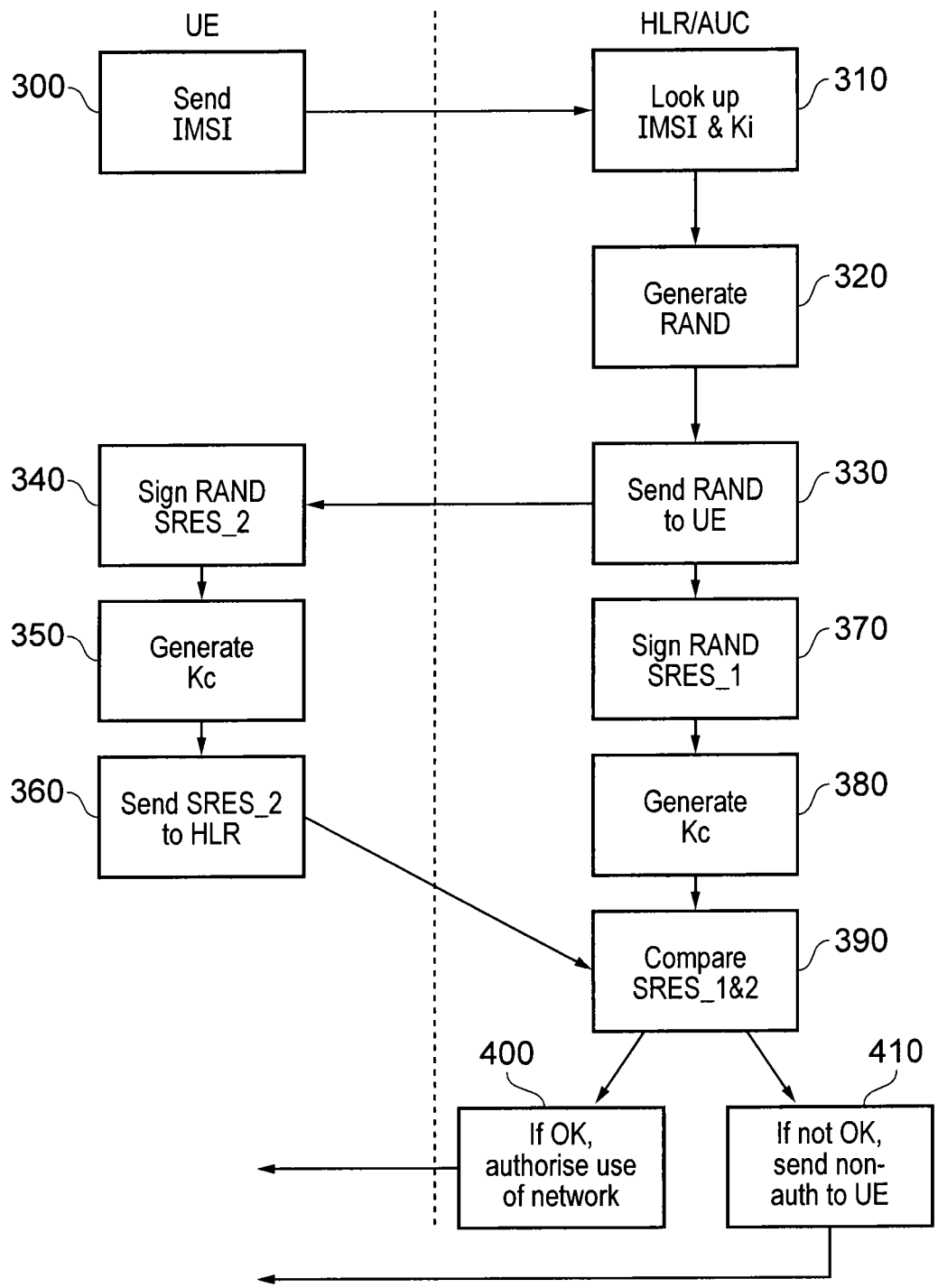
FIG. 6 is a schematic flowchart illustrating an authorization process between a UE and the network.

FIG. 6 is a schematic flowchart illustrating an authorization process between a UE and the network. Steps shown to the left of the vertical broken line are carried out at the UE 10 and steps shown to the right of the vertical line are carried out at the HLR 60 and/or the AUC 70.

At a step 300, the UE sends its IMSI to the network. In response to receipt of the IMSI, the HLR consults the AUC to request that the AUC generates an authorization triplet. The AUC 70 consults its database to find the secure key Ki at a step 310. At a step 320, the AUC generates a single-use random number, RAND. At a step 330, the AUC sends the random number RAND to the UE. The UE receives the random number RAND and, at a step 340, signs the number RAND with the SIM card's secure key Ki to generate a signed response SRES_2.

The SIM card then generates the encryption/decryption key Kc by applying the A8 algorithm to the number RAND and the secure key Ki, at a step 350. As mentioned above, the encryption/decryption key Kc is used later (subject to a successful authorization) for encrypting and decrypting communications via the mobile network during the present session. At a step 360, the UE sends the signed response SRES_2 back to the network.

Meanwhile, the AUC also generates a signed response SRES_1, by applying its stored version of the secure key Ki relating to that IMSI to the number RAND, at a step 370. As a step 380, the AUC generates the encryption/decryption key Kc by applying the A8 algorithm to the number RAND and the secure key Ki.

As a step 390, the AUC compares the signed responses SRES_1 and SRES_2. If the IMSI and Ki pair held by the SIM card of the UE matches the IMSI and Ki pair held by the AUC, and bearing in mind that the versions of the A3 algorithm used by the SIM card and the AUC are the same, then the signed responses SRES_1 and SRES_2 should be identical. If they are identical, then the SIM card should be authorised for use during a current session on the network. Of course, authorization is not provided if an IMSI has already been authorised for a currently open session on the network. But assuming that the IMSI is not already authorised for a currently open session, and the two signed responses are identical, then at step 400, the SIM card holding that IMSI is authorised to use the network and the encryption/decryption key Kc is passed to the SGSN 50. A message is sent by the HLR 60 to the UE 10 to indicate that authorization has been granted.

On the other hand, if either the IMSI is party to a currently open session that has already been authorised, or the two signed responses do not match, then the IMSI is not authorised for a connection session on the network. In this case, a non-authorization message was passed to the UE a step 410, and the version of the encryption/decryption key Kc generated by the AUC is not passed to the network for use in encrypting or decrypting communication with that UE.

The arrangements described above relates to conventional SIM cards having a single respective IMSI and Ki, both of which are unique to that individual SIM card. The arrangements to be described now relate to SIM cards holding multiple IMSIs. In some cases, the multiple IMSIs are provided for temporary use by a UE in which that SIM card is installed. Such an arrangement will now be described in detail.

Here, it is worth distinguishing between "activation" and "registration" in respect of an IMSI.

At activation, an IMSI is activated in the HLR immediately, so the activation cost of € 1-10 is due straightaway. This process takes place in respect of temporary-use IMSIs and is paid for by the manufacturer, for example.

A final IMSI can be provided (see below) for which the user must apply a registration process. At this stage, the user registers the final IMSI to use network services and establishes a one-to-one relationship between the final IMSI, the user's account and the UE in which the SIM card is installed.

Figure 7:
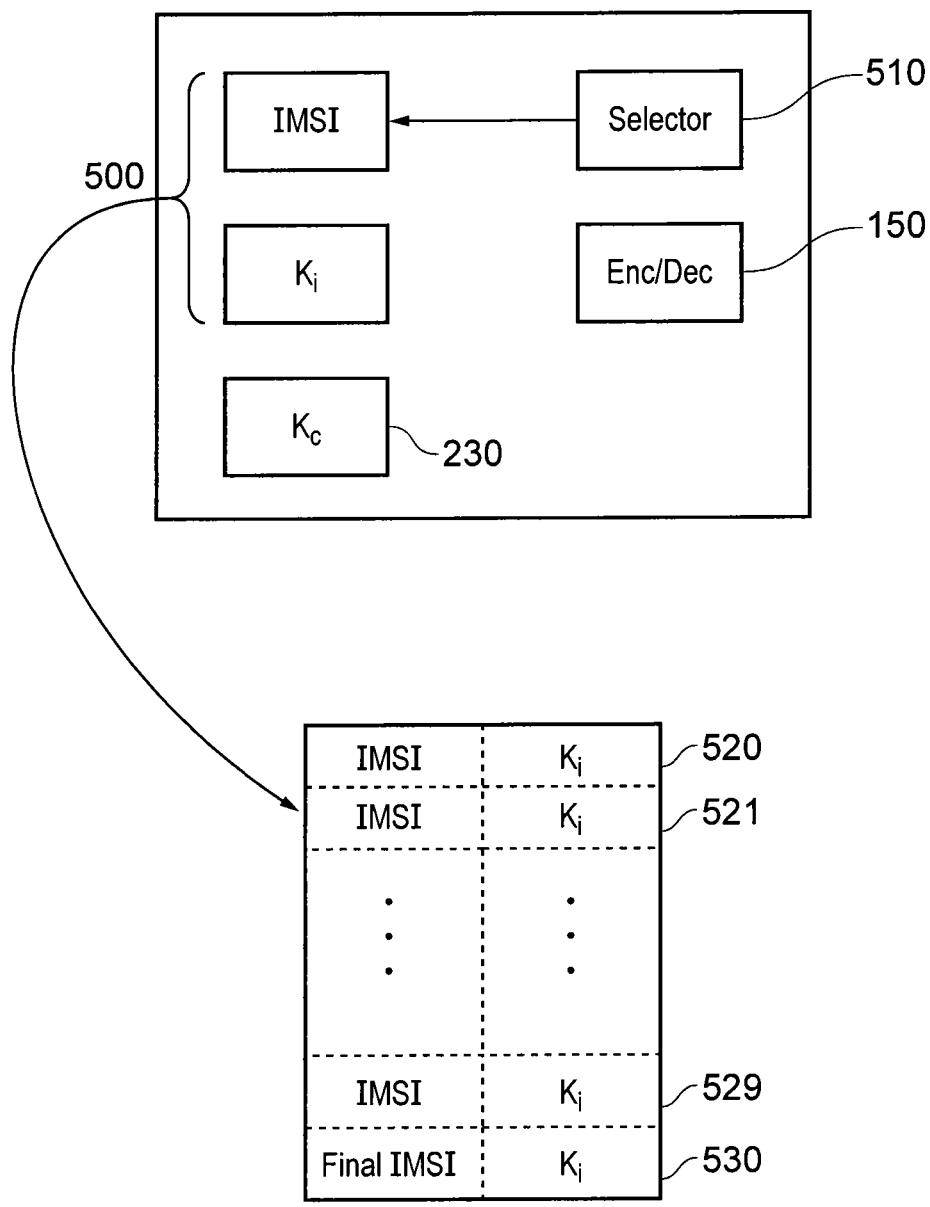
FIG. 7 schematically illustrates a SIM card using multiple IMSIs.

FIG. 7 schematically illustrates a SIM card having multiple IMSIs. The SIM card is similar in many respects to the SIM card shown in FIG. 4, in that it provides an encryption/decryption function 150 and secure storage 230 to hold temporary data such as the encryption/decryption key Kc. Secure storage 500 (or a storage controller to access secure storage, for example within the UE) is also provided to hold IMSI-Ki pairs, and a selector 510 allows selection of an individual IMSI-Ki pair (that is, for selecting a mobile identity from the two or more stored mobile identities) for use in a current authorization process with the AUC.

The lower portion of FIG. 7 schematically illustrates the format of data storage within the secure storage area 500. In basic terms, a table is provided with multiple entries 520, 521 . . . 529, each of which relates to a temporary-use IMSI-Ki pair. In the example of FIG. 7, a further table entry 530 is provided to hold a "final" IMSI-Ki pair. The nature of this final IMSI-Ki pair will be described further below.

Each of the temporary-use IMSI-Ki pairs relates to an IMSI which has been activated with the network. That is to say, the HLR 60 has a data entry relating to that IMSI, and the AUC 70 securely stores a secure key Ki relating to that IMSI. Because the present example relates only to broadband data communication, the MSISDN number (in effect, the telephone number) associated with that IMSI by the HLR 60 is immaterial.

During a period of valid usage of the temporary-use IMSI-Ki pairs by the UE, which period will be described in more detail below, the selector 510 selects a IMSI-Ki pair to be authorised for use in the current session with the mobile network. The selection can be a random selection or according to a predetermined order. For example each time an IMSI-Ki pair needs to be selected from the temporary-use IMSI-Ki pairs, the selector 510 could make an entirely random (or, in effect, pseudo-random) selection, merely on the basis that an IMSI-Ki pair which failed in an attempted authorization in respect of the current session is not reselected. In other words, all of the temporary-use IMSI-Ki pairs except those which have already failed to authorise in respect of the current session are available for the random selection. Alternatively, for example, the selector 510 could choose an IMSI-Ki pair from the data entries 520 . . . 529 according to a cyclic selection, again avoiding any IMSI-Ki pairs which led to an unsuccessful authorization attempt in respect of the current network session. As a further alternative, the selector 510 could maintain details of which IMSI-Ki pairs have been used with successful network authorizations in the past and preferentially select those IMSI-Ki pairs for future authorization attempts. It will therefore be understood that there are many different ways in which the selector 510 can choose an IMSI-Ki pair for a current attempted authorization with the network. The important feature from a technical point of view is that a selection is made from multiple temporary-use IMSI-Ki pairs.

The temporary-use IMSI-Ki pairs stored in the data entries 520 . . . 529 may be selected from a pool of such temporary-use IMSI-Ki pairs established by the manufacturer of the UE, for example. A possible way in which such a pool could be established will now be described.

An example scenario is that the UE is a type of equipment which can make use of an Internet connection but for which an Internet connection is not essential. An example of such equipment might be a portable gaming device or an electronic book (e-book) reader device. Here, the device has sufficient stand-alone functionality that a user can enjoy owning and operating the device in the long term without needing to set up a mobile data service with associated ongoing costs. However, the device manufacturer may realise that the functionality of the device, and hence the user's enjoyment of the device after purchase, can be enhanced by connecting the device to a mobile data network. For example, in the case of a portable gaming device, this could allow interactive games to be played away from the home, or high scores and other game data to be uploaded or downloaded to a game server. In the case of an e-book reader device, a mobile data network connection could allow e-books to be purchased or otherwise downloaded away from the home, or could allow a subscription to a daily newspaper or other real-time publishing arrangement to be fulfilled. So, the use of the mobile data network can make the user's experience of the purchased device more attractive. It is therefore in the interests of the manufacturer of the device to encourage the user to enable a mobile data network service.

Of course, another incentive for encouraging the user to enable a mobile data network service is that a commission may be payable to the manufacturer and/or to the retailer when the user establishes a chargeable mobile data network account.

One way to encourage a user to establish a chargeable mobile data network account is to provide a trial period during which period the user may make use of a mobile data network connection without having to establish a long-term or otherwise chargeable contract with the mobile data network provider. At the end of the trial period, the user has to make a choice as to whether to continue using mobile data network access, in which case the user must start to pay for it, or to cease using mobile data network access.

A technologically straightforward way of allowing such a trial period would be to equip each UE device, as sold, with a conventional SIM card which is activated with the mobile data network, which is to say that the IMSI and Ki associated with that SIM card are held by the AUC. The manufacturer then enters into an agreement with the mobile data network provider so that the manufacturer pays for any mobile data access made during the first (say) two weeks of use of any of the individual SIM cards. At the end of the two weeks' use, the free access (that is to say, the access paid for by the manufacturer) is terminated so that the user is forced to choose whether to establish a chargeable account or to cease using mobile data with the device.

However, a disadvantage of this technique is as follows. Whenever a SIM card is initially activated, that is to say whenever a data entry is created at the HLR and the AUC storing data (as described above) relating to the IMSI associated with that SIM card, the entity carrying out the activation has to pay a fee to the mobile data network. At the time of filing the present application, such a fee is typically between € 1 and € 10. This fee is acceptable for a manufacturer when the manufacturer is reasonably certain that the purchaser will go on to establish a chargeable contract using that SIM card. So, in the case of the purchase of a mobile telephone, the fee can be absorbed by the manufacturer or retailer because commission will be payable when the user starts to make chargeable calls. However, with a data-only device of the type described above (that is to say, a device which has adequate functionality without a mobile data network connection), there may be some unwillingness by the users to bother with a chargeable mobile data network connection. This could mean that the manufacturer has to pay a fee for each SIM card in each device is sold, but it could be that only a small proportion of the SIM cards are eventually linked with a chargeable mobile data account. An aim of the present techniques is to reduce this initial activation cost for the manufacturer while still providing the user with a trial period to assess whether they wish to establish a mobile data network account.

A solution provided by the present embodiments is that the manufacturer establishes a pool of temporary-use IMSIs. The manufacturer pays an activation fee in respect of each of the temporary-use IMSIs. However, the number of temporary-use IMSIs is less than the number of devices as sold. For example, the number of temporary IMSIs could be established as (say) 20% of the expected sales volume of the devices. This means that the initial fees payable by the manufacturer are reduced by 80% relative to the situation described above whereby the manufacturer activates a SIM card for each device as sold.

The technique then allows for (a) an individual one of the temporary-use IMSIs to be allocated to multiple SIM cards, and (b) each SIM card to have several temporary-use IMSIs available to it.

The arrangement relies on various assumptions:
1. Not all users will purchase the device on the same day; this means that the trial periods for the users will not completely overlap. Given that the temporary-use IMSIs are allowed to be used only during the trial period, this means that fewer temporary-use IMSIs are needed than the number of devices sold.
2. Not all users will connect to the mobile data network service at exactly the same time. In the case of a device sold globally, users will tend to make connections according to their local time zone. Also, there will be a random variation in the times at which users decide to make use of the purchased device.
3. Not all users will even necessarily be interested in making use of a mobile data network connection.

All of these factors mean that the system can operate with far fewer temporary-use IMSIs than the number of devices sold.

The allocation of temporary-use IMSIs to SIM cards may be carried out on a pseudo-random basis, and the total number of temporary-use IMSIs available may be much greater than the number of temporary-use IMSIs allocated to any single individual SIM card. Here the aim is that the overlap between the set of temporary-use IMSIs by which one user is attempting to obtain authorization and the set by which another user is attempting to obtain authorization is low.

Figure 8:
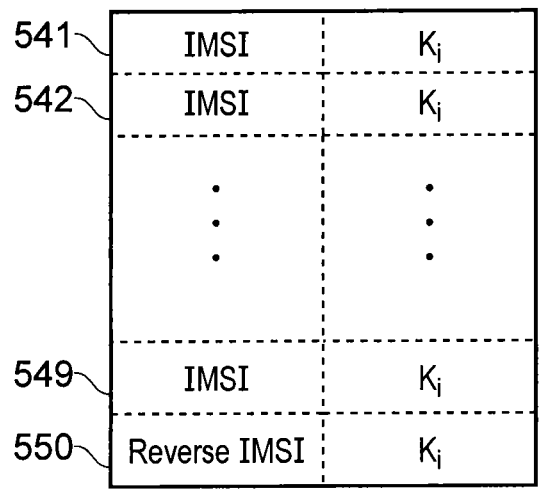
FIG. 8 schematically illustrates an IMSI table having multiple temporary IMSIs and a reserve IMSI.

FIG. 8 schematically illustrates an IMSI table 540 having multiple temporary IMSIs stored in table entries 541 . . . 549 and a reserve IMSI stored in a table entry 550. The relevance of the reserve IMSI will be discussed below.

Figure 9:
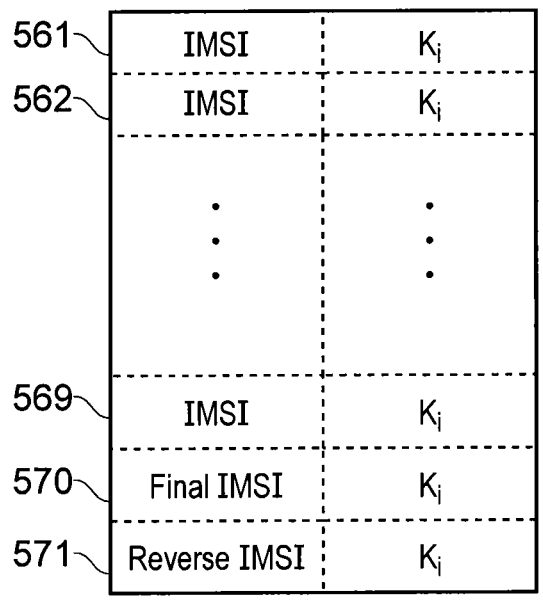
FIG. 9 schematically illustrates an IMSI table having multiple temporary IMSIs, a final IMSI and a reserve IMSI.

FIG. 9 schematically illustrates an IMSI table 560 having multiple temporary IMSIs stored in table entries 561 . . . 569, a final IMSI stored in a table entry 570 and a reserve IMSI stored in a table entry 571. Again, the relevance of the final IMSI and the reserve IMSI will be discussed in full below.

Figure 10:
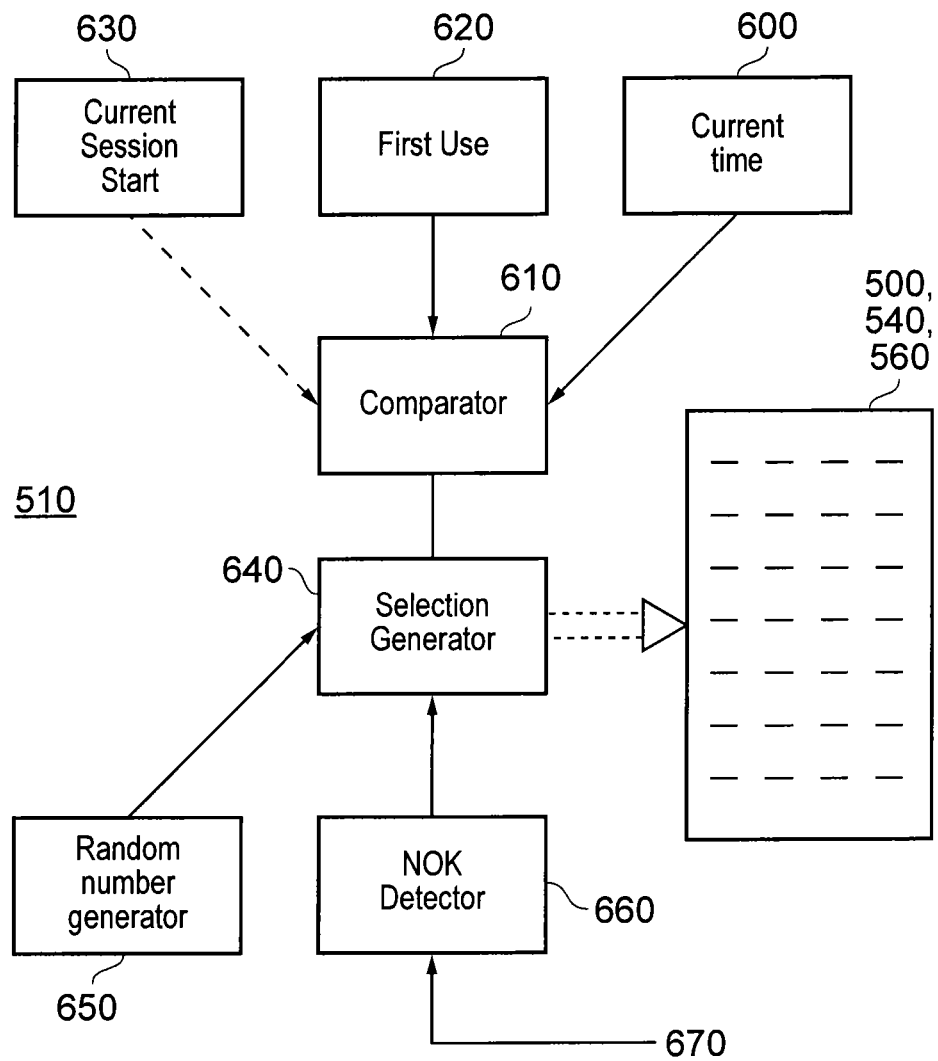
FIG. 10 is a schematic diagram illustrating a part of the operation of an IMSI selector.

FIG. 10 is a schematic diagram illustrating a part of the operation of the selector 510 in the SIM card of FIG. 7.

The selector 510 comprises a timer 600, a comparator 610, a first use memory 620 and, optionally, a current session start time memory 630. A selection generator 640 interacts with the secure memory 500, 540, 560 storing the IMSI-Ki pairs, and receives input from a random number generator 650 and an NOK detector 660 for detecting a failed (unsuccessful) authorization attempt on the basis of NOK (not OK) acknowledgement information 670 received back from the network during such an authorization attempt.

The operation of the selector 510 will be described with reference to FIG. 11.

Figure 11:
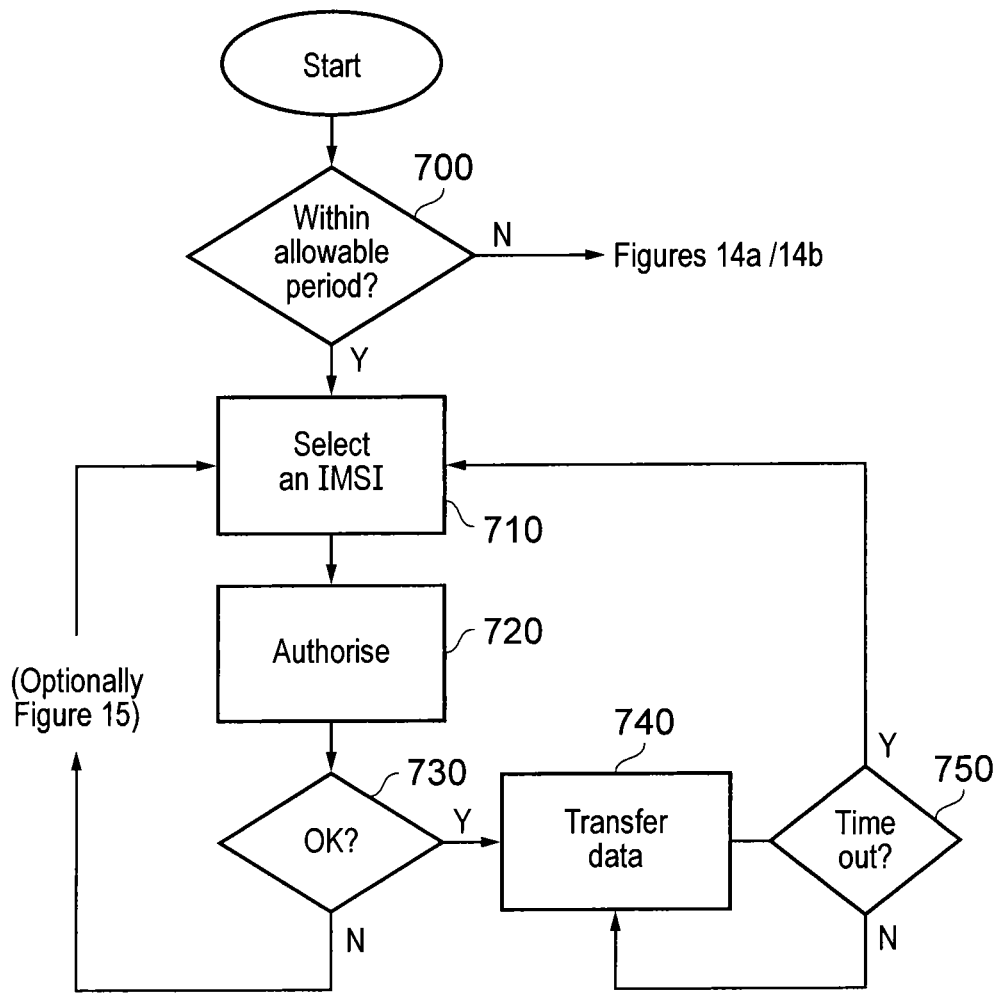
FIG. 11 is a schematic flowchart illustrating the operation of the SIM card FIG. 7 in an authorization mode.

Referring to FIG. 11, at a step 700, the selector 510 detects whether the system is within the allowable period for free operation, that is to say, operation using the temporary IMSIs. That check is carried out by the comparator 610 which acts as a time controller to compare the current time 600 with a stored time 620 (or a time accessed from storage held within the UE) relating to the first use of that SIM card. In turn, that first use time may be stored by copying the current time from the timer 600 to the memory 620 storing the first use time at the instant of first use. Note that the current time may be obtained by the SIM card from the UE itself and/or from time stamps associated with data received from the mobile data network.

If the current time is outside the allowable period for valid use of the temporary-use IMSIs, based on a first predetermined period such as two to four weeks, then control passes to separate operations to be described with reference to FIGS. 14a and 14b.

On the other hand, assuming that the system is currently within the allowable period for use of the temporary-use IMSIs, control passes to a step 710 at which the selection generator 640 selects an IMSI, and associated Ki, for an attempted authorization with the mobile data network. The criteria by which the selection generator can select an IMSI from among the temporary-use IMSIs have been described above. Where a random number is required as part of the selection, that number is provided by the random number generator 650.

At a step 720, the UE attempts to authorise with the mobile data network using the selected IMSI-Ki pair. At a step 730, the selector 510 detects whether authorization was successful. In part, this can be achieved by the detector 660 checking the data 670 received back from the network. If authorization was successful then data transfer can commence at a step 740.

Optionally, a time limit can be applied to the current session. This time limit is checked by the comparator 610 comparing the current time 600 with the current session start time 630. In terms of the flow diagram of FIG. 11, at a step 750 a test is performed to detect whether the current session has exceeded a second predetermined period representing a predetermined allowable length (such as one hour). If not, then control remains with the step 742 allow for the transfer of data over the mobile data network. If yes then control returns to the step 710 in which an IMSI-Ki pair is selected by the selection generator 640 and authorised with the network.

Note that the IMSI-Ki pair selected by the step 710 after the referral from the step 750 may in fact be the same IMSI-Ki pair that was in use for the most recent data transfer. Alternatively, the system could be arranged so that the selection generator is barred from reusing the same IMSI-Ki pair for a period such as (say) the remainder of that calendar day. Note also that the test applied at the step 750 may be a test based on quantity of data transferred rather than time elapsed. So, the system may be forced to re-authorise an IMSI-Ki pair after (say) 500 MB of data transfer. The main aim behind this optional feature is to avoid misuse of the temporary-use IMSIs (which are of course shared between multiple potential users) by an individual user remaining connected to the mobile data network for an excessive time, thereby preventing other users connecting to the network using that IMSI-Ki pair.

Returning to the step 730, in the event of a failed authorization, control returns to the step 710 where (in accordance with the IMSI selection criteria discussed above) the NOK detector 660 initiates the selection by the selection generator 640 of a different IMSI-Ki pair (for example, on a random basis) for a further authorization attempt, from amongst the set of temporary-use IMSIs. An optional further feature may be provided between the steps 730 and 710 in the event of a failed authorization. That feature will be described below with reference to FIG. 15.

Figure 12:
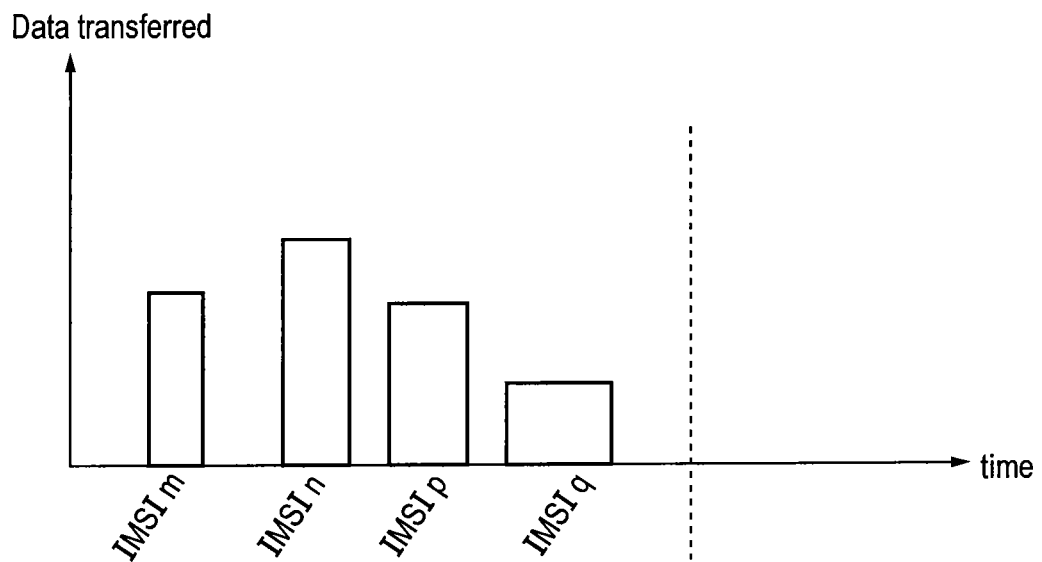
FIG. 12 and FIG. 13 are schematic time lines illustrating data transfer processes using different IMSIs.
Figure 13:
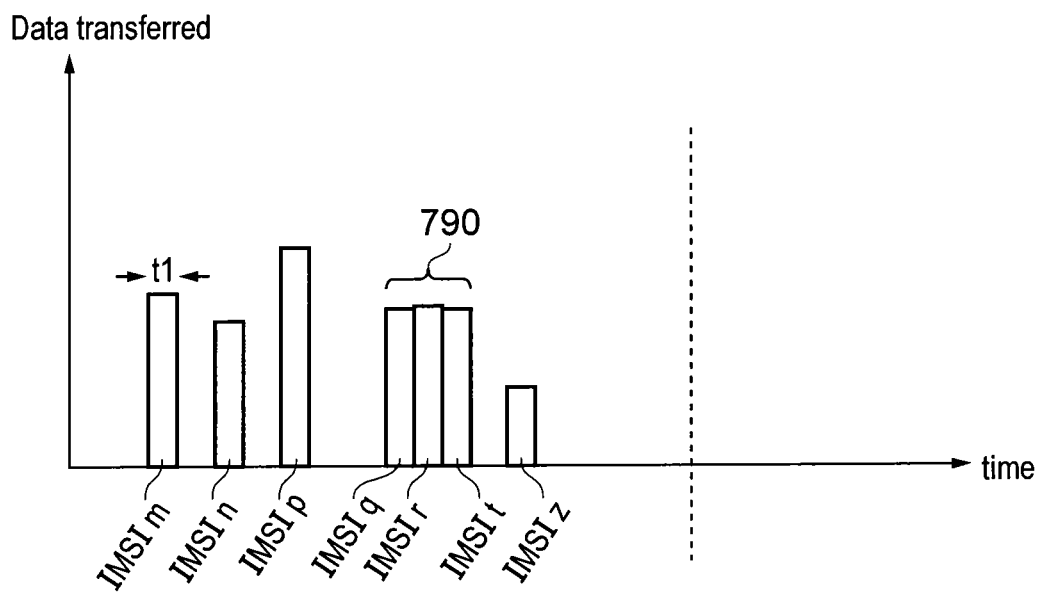

FIGS. 12 and 13 are schematic time lines illustrating data transfer processes using different IMSIs. The IMSIs are referred to in FIGS. 12 and 13 as IMSIs m . . . z. In each case, the quantity of data transferred is represented on a vertical axis and time is represented along a horizontal axis. A vertical dotted line illustrates the end of the period of valid use of the temporary-use IMSIs for that particular SIM card. It can be seen that multiple connection sessions are set up by the user, each time making use of a respective temporary-use IMSI-Ki pair. These IMSI-Ki pairs are selected from any of the temporary-use IMSI-Ki pairs stored on the SIM card. So, it may be that the random selection by the selection generator 640, and the fact that an IMSI is considered unavailable if another user is currently connected using that IMSI, leads to the same IMSI being chosen multiple times or a different IMSI being chosen each time, or various other permutations. So, no technical significance should be attached to the alphabetical order of the variables associated with the different IMSIs in FIG. 12 or in FIG. 13.

The arrangement of FIG. 12 does not include the optional feature of the step 750 in FIG. 11. In this case, the connection sessions are terminated when the user switches the UE off or otherwise disconnects. In FIG. 13, a time limit of t1 is imposed so that each connection session is limited in time. The user does however have the opportunity to reconnect immediately, and this arrangement is illustrated schematically as a succession of connections 790 in FIG. 13.

Figure 14A:
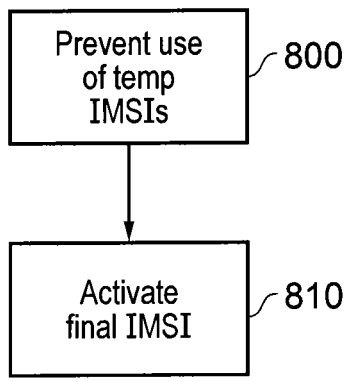
FIGS. 14A and 14B schematically illustrate the authorization of a final IMSI.
Figure 14B:
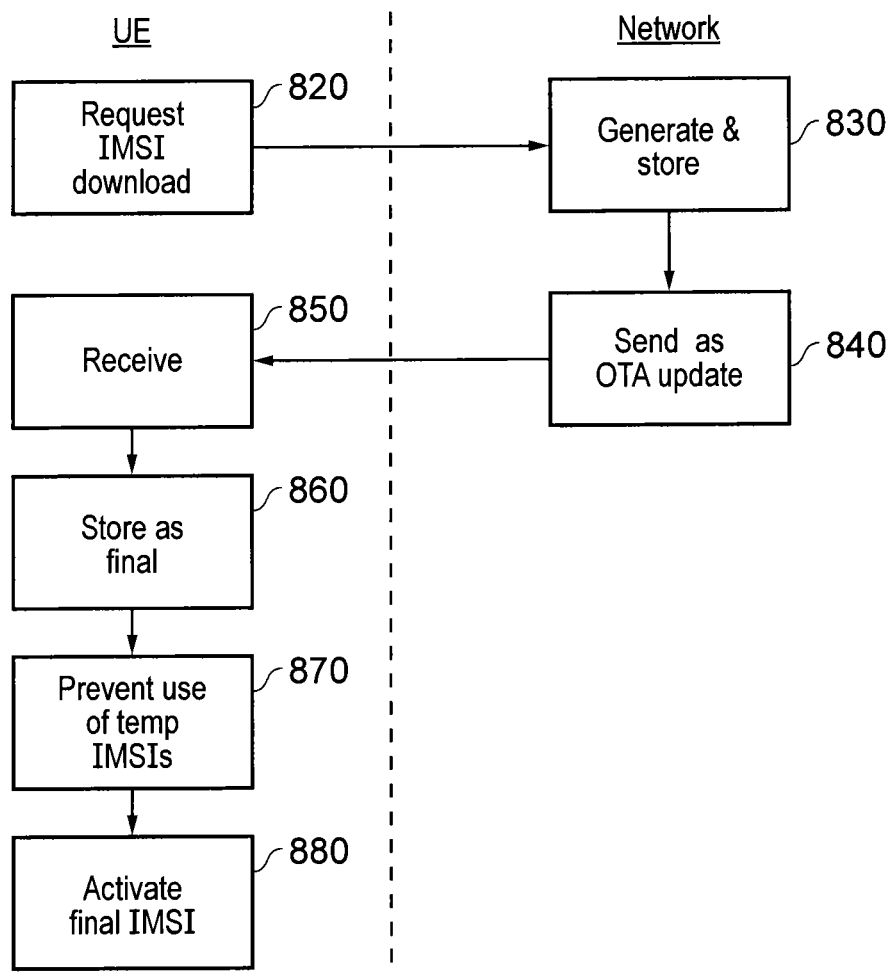

FIGS. 14a and 14b schematically illustrate situations that can occur at the end of the allowable period of use of the temporary-use IMSIs. In this regard, FIGS. 14a and 14b should be considered as alternatives which may be followed at the "no" outcome of the step 700 of FIG. 11.

FIG. 14a applies to situations such as that shown in the lower part of FIG. 7 or in FIG. 9, where the IMSI storage includes a single final IMSI and Ki already stored in a secure manner on the SIM. The final IMSI is not considered as part of the group of temporary-use IMSIs and so is not allowed to be selected (or at least inhibited from selection) by the selector 510 during the allowable period of use of the temporary-use IMSIs. It could be therefore considered as remaining dormant during the use of the temporary-use IMSIs.

However, once the period of use of the temporary-use IMSIs has expired, the final IMSI is the only IMSI remaining for use. The final IMSI is specific to that UE and is not shared with any other SIM card. Its use requires the user to arrange individual payment for chargeable data access. This contrasts with the period of use of the temporary-use IMSIs, during which the data access was charged to the SIM provider, the manufacturer or the like by a bulk charging arrangement which did not care which device was accessing the network via which SIM card, Accordingly, in FIG. 14a, at a step 800 the SIM card prevents the use of the temporary-use IMSIs any further. This could be by deleting the temporary-use IMSIs from the relevant memory area and/or by causing the selector 510 only to select the final IMSI on this and any future occasions. At a step 810, the final IMSI is activated. It is then up to the user to interact with the mobile data network operator responsible for the final IMSI to establish a charging account for future data access. In embodiments of the invention, this can take place via a service within the UE's firmware, or via the manufacturer's or the network operator's websites, and may lead, as described elsewhere in the present description, to the recordal of an IMSI in the HLR which has a one-to-one relationship with that UE's billing record.

An alternative arrangement is illustrated in FIG. 14b. Here, storage is provided for a final IMSI-Ki pair but these are not present in the SIM card when it is supplied with the UE. Instead, they are provided by the network and are downloaded to the SIM card for storage in (for example) flash memory within the storage area 500, 560. In the case of the storage area illustrated in FIG. 8, the downloaded final IMSI-Ki pair could be written to the storage area so as to overwrite one or all of the temporary-use IMSIs. The secure over the air (OTA) data transfer of an IMSI-Ki pair from the mobile network to a SIM card can, for example, make use of techniques disclosed in ETSI TS 102 225.

Referring to FIG. 14b, at a step 820, the SIM card requests (from the network) the download of a final IMSI and Ki pair. Note that the request for the download is in fact a data transaction itself over the mobile data network. So, it can be carried out either using a temporary-use IMSI-Ki pair or, in the case of FIGS. 8 and 9, using the reserve IMSI-Ki pair.

At a step 830, the AUC generates and stores a final IMSI-Ki pair, and at a step 840 transmits these to the SIM card by a secure OTA transaction or in other embodiments by a wired internet connection. The secure data is received by the card as a step 850 and is stored as described above, as a step 860. Now, at a step 870 the SIM card can delete or otherwise disable the temporary-use IMSIs before activating the final IMSI as received, at a step 880.

Referring back to FIG. 11, additional steps may be incorporated into the path following the "no" determination by the step 730, back to the step 710. Such additional steps are shown schematically in FIG. 15.

Figure 15:
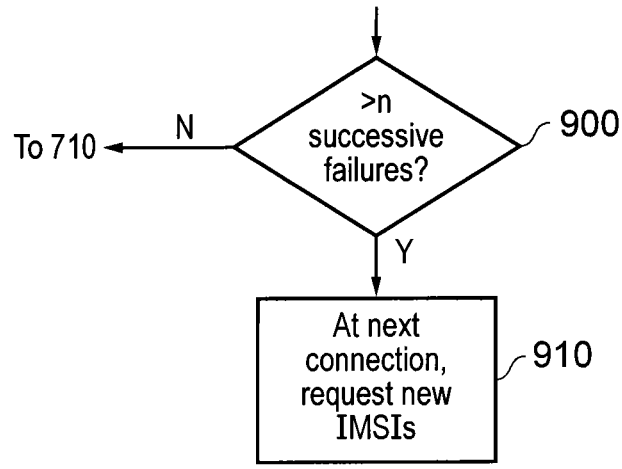
FIG. 15 is a schematic flowchart illustrating the acquisition of further temporary IMSIs.

In FIG. 15, at a step 900 a test is carried out after referral from the step 730 to detect whether the number of successive failed authorization attempts (that is, authorization attempts without a valid authorization having been obtained) exceeds a predetermined threshold value. The threshold value is shown as n in FIG. 15, and may be, for example, approximately ⅔ of the total number of temporary-use IMSIs. So, if (say) 10 temporary-use IMSIs are provided on the SIM card, the number n could be six or seven.

If the outcome of the test at the step 900 is "no", then control returns to the step 710. If however, the outcome is "yes", which is to say that a large number of successive authorization failures have occurred, then at a step 910 the SIM card can send a request for some new temporary-use IMSIs to be downloaded from the AUC at the next available connection. Although new temporary IMSIs could be set up in response to such a request, these new temporary-use IMSIs may simply be selected from the existing pool of temporary-use IMSIs, so as to give a fresh selection from which the UE may attempt to connect to the mobile data network. At the next successful connection, the AUC may supply a number of new temporary-use IMSIs from the pool to replace (overwrite) one or more of the temporary-use IMSIs currently stored in the SIM card. Naturally, it would be inappropriate to overwrite the temporary-use IMSI which is being used for the connection over which the update is provided. The reserve IMSI (if present) could be used for this transaction. The reserve IMSI-Ki pair may be restricted so that it can be selected only if the NOK detector 660 has detected the predetermined number of successive failed authorization procedures and/or for the activation and/or downloading of a final IMSI-Ki pair.

Figure 16:
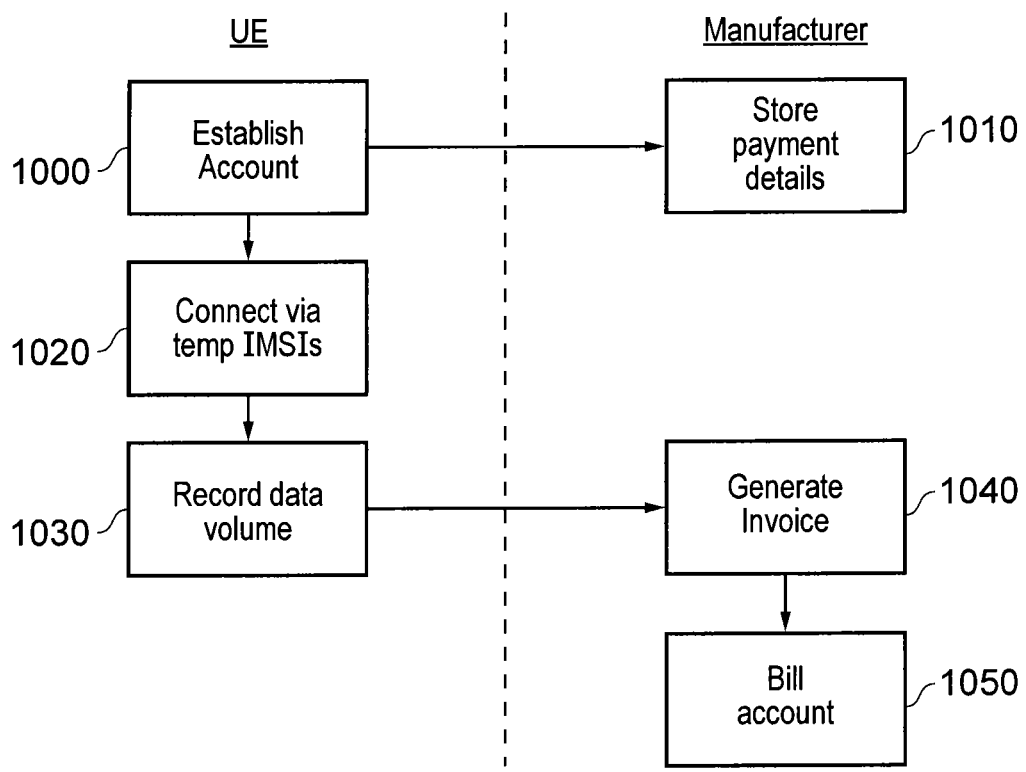
FIG. 16 is a schematic flowchart illustrating a billing process for a UE using temporary IMSIs.

FIG. 16 is a schematic flowchart illustrating a billing process for a UE using temporary IMSIs.

In the situations described above, a time limit has been imposed for the use of the temporary-use IMSIs. The reason for this is that the data costs associated with the temporary-use IMSIs are met by the UE manufacturer, and so it would be uneconomic to allow longer-term use for free of the temporary-use IMSIs.

However, if a separate billing arrangement is established, which is to say, a billing arrangement independent of the mobile data network's billing system, then ongoing use of the temporary-use IMSIs can be allowed by the UE manufacturer.

Referring to FIG. 16, as a step 1000, the user establishes an account with the UE manufacturer for payment of data charges related to the purchased UE. The manufacturer stores payment and related details as a step 1010. At a time when the user wishes to carry out mobile data access using the UE, the UE connects to a mobile data network at a step 1020 using a temporary IMSI-Ki pair. The UE can transfer data to or from the Internet over this data connection. Add a step 1030, the UE (for example the application software 140) acts as a data transferred detector and records the data transfer duration and/or data volume transferred via this route. The UE transmits details of the data transfer duration and/or data volume to the manufacturer which, at a step 1040, generates an invoice relating to the transfer data and charges the user's account at a step 1050.

Figure 17:
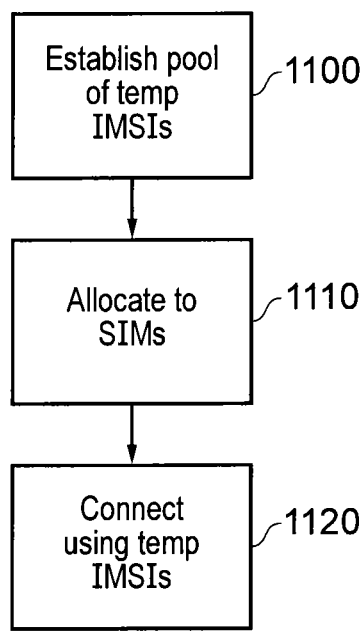
FIG. 17 schematically illustrates a method of operation of a mobile network.

Referring to FIG. 17, a method of operation of a mobile data network having multiple mobile terminals comprises establishing (at a step 1100) a pool of temporary IMSI-Ki pairs (mobile identities).

At a step 1110, the set of mobile identities is distributed amongst the mobile terminals such that:

each mobile terminal holds a respective subset comprising two or more of the set of mobile identities;

at least some of the mobile identities are held by more than one mobile terminal; and a mobile terminal can connect (at a step 1120) to the mobile data network using any one of that mobile terminal's subset of mobile identities, subject to that mobile identity not already being in use in respect of a current connection by another mobile terminal.

In embodiments of the invention, there are fewer distinct mobile identities in the set than the number of mobile terminals amongst which the set of mobile identities is distributed.

Figure 18:
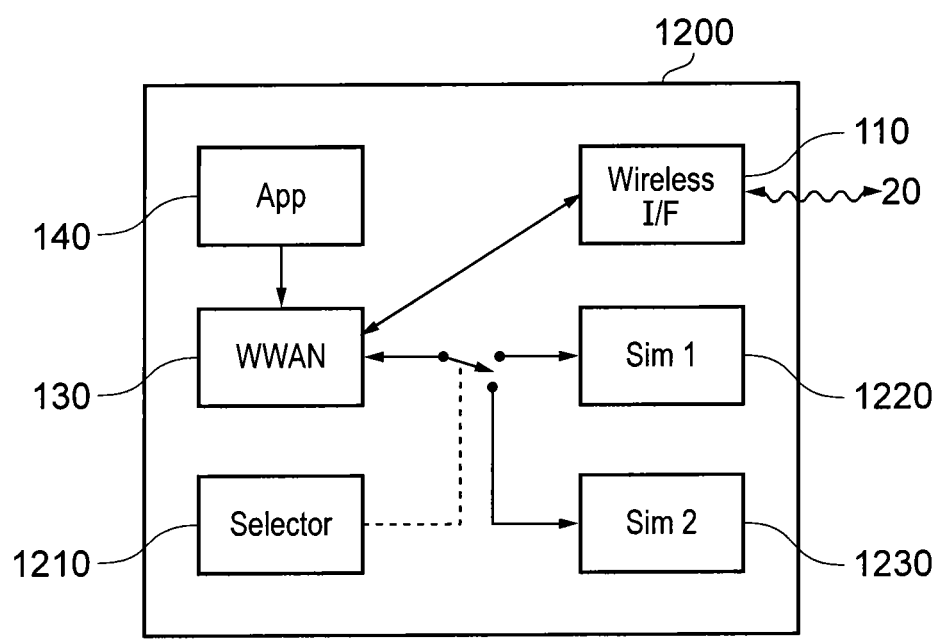
FIG. 18 schematically illustrates a UE employing multiple SIM cards.

FIG. 18 schematically illustrates a UE 1200 having more than one SIM card. The UE comprises application software 140, a WWAN processor 130 and a wireless interface 110 similar to those shown in FIG. 2. However, the UE comprises two (or more) SIM cards 1220, 1230 and a selector 1210 to select between the two SIMs. One of these (1220) is removable, to allow the user to select his own data provider if desired. The other SIM 1230 is non-removable by the user, being (optionally) hard-wired into the UE.

This arrangement can be used in various different ways.

For example, the non-removable SIM card 1230 could be a SIM card having multiple temporary IMSIs, as defined above. There would be no need for such a SIM card to have or acquire a final IMSI because even when the temporary-use IMSIs have expired, the user can obtain data access via the removable SIM card. So, in such an arrangement, the non-removable SIM card would be just to provide the trial period of access.

In another example, the non-removable SIM card could hold only a reserve IMSI, for use only in a certain set of data processing events or circumstances. Such a set could include one or more selected from the following list:

a failure of the UE to connect to a mobile network using the removable SIM;

a detection by the UE of a data processing failure by the UE (so that diagnostic data can be sent to the manufacturer); and a scheduled request by the UE for a data and/or software update from an update server.

While the description above has referred to SIM cards and IMSIs, these terms are sometimes considered to relate to particular network standards or protocols. It will be appreciated that any type of identification module and mobile identity data fulfilling the basic requirements of identifying a node on a data network may be used in embodiments of the invention.

The techniques described above may be implemented in hardware, software, programmable hardware such as application specific integrated circuits or field programmable gate arrays, or combinations of these. It will be understood that where the techniques are implemented, at least in part, by software or the like, then such software and providing media (such as non-transitory machine-readable storage media, such as a magnetic disk, optical disk or flash memory) by which such software is provided are considered as embodiments of the invention.

Although the techniques have been described in respect of devices using data services, the UE could comprise one or more audio transducers and an audio data encoder and decoder; and at least some of the data transferred over the mobile data network could comprise encoded audio data handled by the audio data encoder and decoder. The multiple temporary IMSI arrangement could be suitable for services such as emergency distress beacons which (a) require to communicate very infrequently, and (b) do not necessarily need a fixed mobile telephony number (MSISDN).

As described above, embodiments of the invention provide a method of operation of a mobile data network, the network being configured to interact with multiple mobile terminals the method comprising:

(i) distributing a set of mobile identities for use in mobile terminals such that:

each mobile terminal is allocated a respective subset comprising two or more of the set of mobile identities; and at least some of the mobile identities are allocated to more than one mobile terminal;

(ii) allowing connection of a mobile terminal to the mobile data network using any one of that mobile terminal's allocated subset of mobile identities, subject to that mobile identity not already being in use in respect of a current connection by another mobile terminal.

In embodiments of the invention, as described above, there may be fewer distinct mobile identities in the set than the number of mobile terminals amongst which the set of mobile identities is distributed.

As described above, embodiments of the invention provide a method of operation of a mobile data network, the network being configured to interact with multiple mobile terminals, the method comprising:

distributing multiple mobile identities for use in a mobile terminal;

allowing connection of a mobile terminal to the mobile data network using any one of that mobile terminal's allocated subset of mobile identities, subject to that mobile identity not already being in use in respect of a current connection by another mobile terminal;

a mobile network operator charging a mobile terminal provider for accesses made to the mobile data network using any of the mobile identities;

the mobile terminal provider charging users of the mobile terminals according to the access made to the mobile data network irrespective of which of the multiple mobile identities a mobile terminal used to obtain such access.

It will be appreciated that although examples have been described with respect to particular mobile telecommunications standards, the invention is not limited to a particular standard, and is applicable to various arrangements in which an identification module carries a mobile identity. Examples of identification modules in other formats include the Universal Integrated Circuit Card (UICC) in UMTS, while the Removable User Identity Module (R-UIM) is used in some CDMA (code division multiple access) systems.

Embodiments of the invention can provide an identification module in which the data defining a mobile identity comprises: an identification value transmitted to the mobile network as part of the network authorization procedure; and a secure key which is not transmitted to the mobile network as part of the network authorization procedure, but from which the network interface derives identification data and encryption/decryption key data for use in encryption and decryption of data communication over the mobile network.

Embodiments of the invention can provide an identification module in which the identification module is a subscriber identification module (SIM) card.

Embodiments of the invention can provide an apparatus comprising a data transfer detector configured to detect the duration and/or data volume of data transfers over the mobile data network, and to transmit billing data to a billing server based on the detected duration and/or data volume.

Embodiments of the invention can provide an apparatus in which: the apparatus comprises one or more audio transducers and an audio data encoder and decoder; and at least some of the data transferred over the mobile data network comprises encoded audio data handled by the audio data encoder and decoder.

Embodiments of the invention can provide mobile data processing apparatus comprising: a wireless interface arranged to communicate with a mobile data network; a removable identification module providing data to the wireless interface so as to identify the mobile data processing apparatus to the mobile data network according to a mobile identity stored by that identification module; and a further non-removable identification module storing a separate mobile identity; in which the apparatus is configured to attempt authorization with a mobile network using the separate mobile identity stored on the further identification module in response to one of a predetermined list of data processing events comprising one or more events selected from: a detection by the apparatus of a data processing failure by the apparatus; and a scheduled request by the apparatus for a data and/or software update from an update server.

Embodiments of the invention can provide such an apparatus in which the list of data processing events comprises a failure of the apparatus to connect to a mobile network using the removable identification module.

Embodiments of the invention can provide a method of operation of a mobile data processing apparatus having a wireless interface arranged to communicate with a mobile data network, a removable identification module providing data to the wireless interface so as to identify the mobile data processing apparatus to the mobile data network according to a mobile identity stored by that identification module, and a further identification module storing a separate mobile identity; the method comprising: attempting authorization with a mobile network using the separate mobile identity stored on the further identification module in response to one of a predetermined list of data processing events comprising one or more events selected from: a detection by the apparatus of a data processing failure by the apparatus; and a scheduled request by the apparatus for a data and/or software update from an update server.

Embodiments of the invention can provide a method of operation of a mobile data network, the network being configured to interact with multiple mobile terminals, the method comprising:

(i) distributing a set of mobile identities for use in mobile terminals such that:

each mobile terminal is allocated a respective subset comprising two or more of the set of mobile identities; and at least some of the mobile identities are allocated to more than one mobile terminal;

(ii) allowing connection of a mobile terminal to the mobile data network using any one of that mobile terminal's allocated subset of mobile identities, subject to that mobile identity not already being in use in respect of a current connection by another mobile terminal.

Embodiments of the invention can provide such a method in which there are fewer distinct mobile identities in the set than the number of mobile terminals amongst which the set of mobile identities is distributed.

Embodiments of the invention can provide a method of operation of a mobile data network, the network being configured to interact with multiple mobile terminals, the method comprising:

distributing multiple mobile identities for use in a mobile terminal;

allowing connection of a mobile terminal to the mobile data network using any one of that mobile terminal's allocated subset of mobile identities, subject to that mobile identity not already being in use in respect of a current connection by another mobile terminal;

a mobile network operator charging a mobile terminal provider for accesses made to the mobile data network using any of the mobile identities;

the mobile terminal provider charging users of the mobile terminals according to the access made to the mobile data network irrespective of which of the multiple mobile identities a mobile terminal used to obtain such access.

Embodiments of the invention can provide an identification module, a mobile data processing apparatus, a method of operation of an identification module, a method of operation of a mobile data processing apparatus, a method of operation of a mobile data network, or computer software, substantially as hereinbefore described with reference to the accompanying drawings.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. Identification circuitry for securely providing a mobile identity to a mobile data network for use in identifying mobile equipment in which the identification circuitry is installed, the identification circuitry comprising:

a mobile identity storage controller configured to access memory which securely stores data defining two or more different mobile identities;

a selector configured to select the mobile identity from the two or more different mobile identities;

a network interface configured to generate data derived from the selected mobile identity for transmission to a mobile network during a network authorization procedure, and to receive acknowledgement data back from the mobile network indicating whether authorization was successful based on the selected mobile identity;

a detector configured to detect whether the acknowledgement data indicates an unsuccessful authorization with the mobile network and, if so, to initiate a further network authorization procedure in which the selector selects a different one of the two or more different mobile identities, wherein
- at least two of the different mobile identities are temporary-use mobile identities, the temporary-use mobile identities being stored in the identifying mobile equipment prior to the network authorization procedure; and
a time controller configured to control use of the temporary-use mobile identities to no longer than a first predetermined period, such that the temporary-use mobile identities are not useable for the network authorization after the first predetermined period, wherein:
the time controller defines the first predetermined period with reference to a first use of the identification circuitry;
the selector is configured to select only a single stored mobile identity for use after an expiry of the first predetermined period;
the time controller is configured to inhibit the selector from selecting the single stored mobile identity until the expiry of the predetermined period; and
the selector is configured to randomly select from amongst the available mobile identities.

2. The identification circuitry according to claim 1, wherein the network interface is configured to request a secure data transfer of data defining the single stored mobile identity from the mobile network, and to store the data defining the single stored mobile identity in the memory.

3. The identification circuitry according to claim 1, wherein:
the memory stores the single stored mobile identity in addition to the two or more different mobile identities.

4. The identification circuitry according to claim 1, wherein the detector is configured:
to detect whether at least a predetermined number of successive authorization procedures have failed;
if so, to request, at a subsequent successful authorization, a secure data transfer of data defining one or more replacement mobile identities from the mobile network; and
to store the data defining the one or more replacement mobile identities in the memory so as to overwrite data defining respective previously stored mobile identities.

5. The identification circuitry according to claim 4, wherein the memory stores a reserve mobile identity, the selector being configured to select the reserve mobile identity only if the detector has detected the predetermined number of successive failed authorization procedures.

6. The identification circuitry according to claim 1, wherein the network interface is configured to initiate a further authorization procedure with respect to a different one of the stored mobile identities, after a second predetermined period of continuous connection to the mobile network.

7. A set of identification circuitry, each according to claim 1, wherein at least one of the mobile identities stored by one of the set is identical to a mobile identity stored by another of the set.

8. A mobile data processing apparatus comprising:
a wireless interface configured to communicate with a mobile data network; and
the identification circuitry according to claim 1, the identification circuitry providing data to the wireless interface so as to identify the mobile data processing apparatus to the mobile data network.

9. The apparatus according to claim 8, comprising a data transfer detector configured to detect a duration and/or data volume of data transfers over the mobile data network, and to transmit billing data to a billing server based on the detected duration and/or data volume.

10. The apparatus according to claim 8, further comprising:
one or more audio transducers and an audio data encoder and decoder, wherein
at least some of the data transferred over the mobile data network includes encoded audio data handled by the audio data encoder and decoder.

11. The apparatus according to claim 8, wherein:
the identification circuitry is a removable identification circuitry;
the apparatus comprises a further non-removable identification circuitry storing a separate mobile identity; and
the apparatus is configured to attempt authorization with a mobile network using the separate mobile identity stored on the further non-removable identification circuitry in response to one of a predetermined list of data processing events.

12. The apparatus according to claim 11, wherein the predetermined list of data processing events comprises one or more selected from the list consisting of:
a failure of the apparatus to connect to a mobile network using the removable identification circuitry;
a detection by the apparatus of a data processing failure by the apparatus; and
a scheduled request by the apparatus for a data and/or software update from an update server.

13. A method of operation of identification circuitry which securely provides a mobile identity to a mobile data network for use in identifying mobile equipment in which the identification circuitry is installed, the method comprising:
securely storing data defining two or more different mobile identities;
selecting the mobile identity from the two or more different mobile identities, wherein at least two of the different mobile identities are temporary-use mobile identities, the temporary-use mobile identities being stored in the identifying mobile equipment prior to a network authorization procedure;
generating data derived from the selected mobile identity for transmission to a mobile network during the network authorization procedure;
receiving acknowledgement data back from the mobile network indicating whether authorization was successful based on the selected mobile identity;
detecting whether the acknowledgement data indicates an unsuccessful authorization with the mobile network;
in the case that the acknowledgement data indicates an unsuccessful authorization with the mobile network, repeating the selecting so as to select a different one of the two or more different mobile identities and initiating a further network authorization procedure using the newly selected mobile identity;
controlling use of the temporary-use mobile identities to no longer than a first predetermined period, such that the temporary-use mobile identities are not useable for the network authorization after the first predetermined period;
defining the first predetermined period with reference to a first use of the identification circuitry;
selecting only a single stored mobile identity for use after an expiry of the first predetermined period; and inhibiting the selecting from selecting the single stored mobile identity until the expiry of the predetermined period, wherein the selecting includes randomly selecting from amongst the available mobile identities.

14. A non-transitory computer readable medium having a computer program recorded thereon, the computer program configured to perform a method when executed on a computer, the method controlling operation of identification circuitry which securely provides a mobile identity to a mobile data network for use in identifying mobile equipment in which the identification circuitry is installed, the method comprising:

securely storing data defining two or more different mobile identities;

selecting the mobile identity from the two or more different mobile identities, wherein at least two of the different mobile identities are temporary-use mobile identities, the temporary-use mobile identities being stored in the identifying mobile equipment prior to a network authorization procedure;

generating data derived from the selected mobile identity for transmission to a mobile network during the network authorization procedure;

receiving acknowledgement data back from the mobile network indicating whether authorization was successful based on the selected mobile identity;

detecting whether the acknowledgement data indicates an unsuccessful authorization with the mobile network;

in the case that the acknowledgement data indicates an unsuccessful authorization with the mobile network, repeating the selecting so as to select a different one of the two or more different mobile identities and initiating a further network authorization procedure using the newly selected mobile identity;

controlling use of the temporary-use mobile identities to no longer than a first predetermined period, such that the temporary-use mobile identities are not useable for the network authorization after the first predetermined period;

defining the first predetermined period with reference to a first use of the identification circuitry;

selecting only a single stored mobile identity for use after an expiry of the first predetermined period; and inhibiting the selecting from selecting the single stored mobile identity until the expiry of the predetermined period, wherein the selecting includes randomly selecting from amongst the available mobile identities.

\* \* \* \* \*